Oct. 23, 1962  A. C. THOMPSON III  3,059,809
UTENSIL OR SET OF UTENSILS WITH REMOVABLE HANDLE
Original Filed April 30, 1959  2 Sheets-Sheet 1
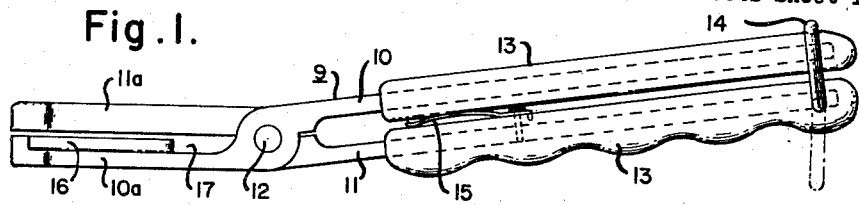
Fig. 1.
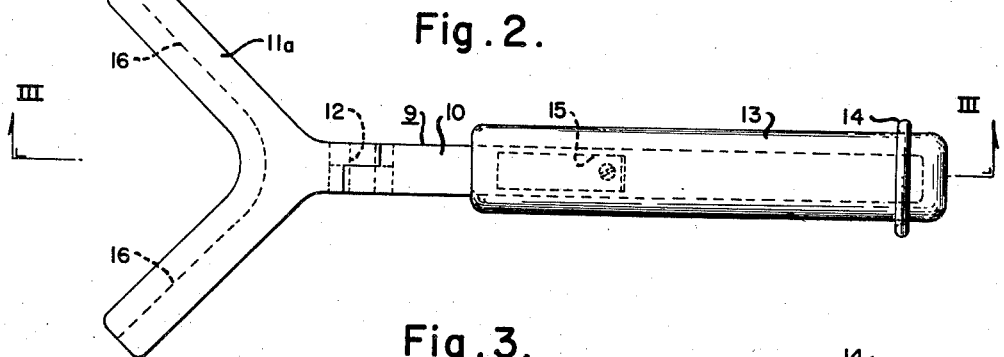
Fig. 2.
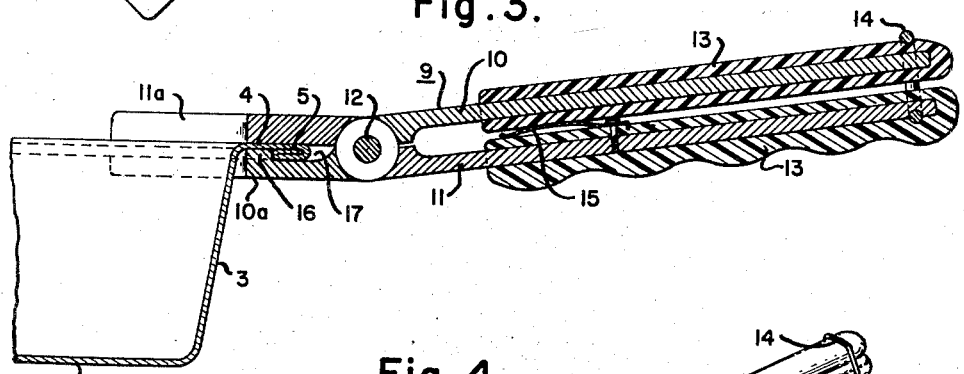
Fig. 3.
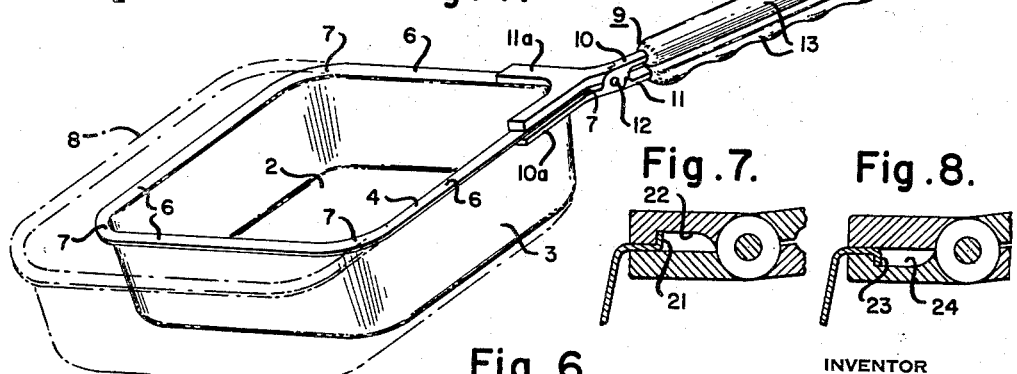
Fig. 4.
Fig. 5. Fig. 6. Fig. 7. Fig. 8.
INVENTOR
Alexander C. Thompson III
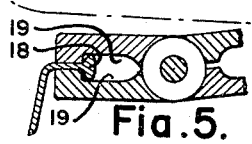
his attorneys Oct. 23, 1962　　　A. C. THOMPSON III　　　3,059,809
UTENSIL OR SET OF UTENSILS WITH REMOVABLE HANDLE
Original Filed April 30, 1959　　　　　　　　2 Sheets-Sheet 2

INVENTOR
Alexander C. Thompson III
his attorneys

United States Patent Office 3,059,809
Patented Oct. 23, 1962

3,059,809
UTENSIL OR SET OF UTENSILS WITH REMOVABLE HANDLE
Alexander C. Thompson III, Upper St. Clair Township, Allegheny County, Pa.
Continuation of application Ser. No. 810,013, Apr. 30, 1959. This application Sept. 22, 1960, Ser. No. 57,773
7 Claims. (Cl. 220—94)

This invention relates to a utensil or set of utensils with a removable handle. The invention has to do with a novel cooperative form of utensil and removable handle whereby a connection of unprecedented strength and holding power between the utensil and handle is provided for and whereby a single removable handle may be employed for handling utensils of different sizes. This application is a continuation of my copending application Serial No. 810,013, filed April 30, 1959.

Removable handles for utensils are well known in the art. Many patents have been granted for removable handles for utensils but such patents so far as I am aware have, insofar as they have related to removable handles applicable to the rim portions of the utensils, contemplated the provision of removable handles applicable only to utensils having circular rims. The curvature of the rims of utensils of different sizes having circular rims differs and the removable handles heretofore provided have not been adapted for use with utensils of different sizes since such handles fashioned to fit a utensil having a circular rim of one size did not correctly fit a circular rim of greater or less curvature and hence did not provide a connection of optimum strength and holding power when applied to a utensil having such a rim.

My removable handle not only forms a connection of unprecedented strength and holding power with the utensil to which it is applied but is applicable without diminution of the strength and holding power of the connection to utensils of different sizes.

I provide a utensil having a body and a rim and a removable handle for the utensil, the handle having opposed jaws connected together so as to be relatively manipulatable to grip the utensil rim, at least one and preferably each of the opposed jaws having a gripping portion engaging one face of the rim at at least three points relatively located so that a straight line joining two of the points lies in a plane perpendicular to the plane of the rim which intersects the body of the utensil, and an outwardly projecting holding portion adapted to be held in the hand of the person using the utensil. The defined points of engagement of the jaws of the handle with the rim of the utensil establish a plane which is intersected by and reinforced by the body or a projection of the body of the utensil to form a rigid structure which obviates any tendency of the projecting portion of the utensil to bend down or sag relative to the gripped portion. This structure will continue to be rigid whether or not the rim extends beyond the gripped portion.

I further provide a utensil having a rim having portions merging in a corner and a removable handle for the utensil appliable to the utensil with the hereafter mentioned holding portion thereof disposed so as to substantially bisect the outside angle of the rim formed by said portions of the rim, the handle having opposed jaws connected together so as to be relatively manipulatable to grip the utensil rim in the region of the corner, at least one of the opposed jaws having a gripping portion of generally V shape with the arms of the V extending respectively along said portions of the rim, and an outwardly projecting holding portion adapted to be held in the hand of the person using the utensil. The portions of the rim merging in the corner may be straight or substantially so, or they may be curved. They may merge into a sharp corner or a rounded corner. I prefer a rounded corner for sanitary and utilitarian reasons.

While one of the opposed jaws of my removable handle may have a gripping portion of generally V shape as above mentioned and the other jaw may have a gripping portion of another shape opposed to the first mentioned gripping portion to engage the rim of the utensil when the handle is applied, I prefer to provide each of the opposed jaws with a gripping portion shaped to conform to the portion of the utensil rim to which the handle is applied. Specifically I prefer to provide each of the opposed jaws with a gripping portion of generally V shape with the arms of the V extending respectively along the portions of the rim merging in the corner.

More specifically I provide a utensil having a rim having a bead at its edge, the rim having portions merging in a corner, and a removable handle for the utensil, the handle having opposed jaws connected together so as to be relatively manipulatable to embrace the bead and grip the utensil rim in the region of the corner, at least one of the opposed jaws having a gripping portion of generally V shape with the arms of the V extending respectively along said portions of the rim. I use the word "bead" as a word of broad definition and not of limitation to comprehend any kind of peripheral enlargement on the rim of the utensil. The bead may be formed by rolling, upsetting, flanging or otherwise.

In its preferred form my invention contemplates a utensil having a rim having generally straight portions merging in a corner, preferably a rounded corner, and a removable handle for the utensil, the handle having opposed jaws connected together so as to be relatively manipulatable to grip the utensil rim in the region of the corner, at least one of the opposed jaws having a gripping portion of generally V shape with rounded apex conforming to the rounded corner of the rim when the rim is so formed and with the arms of the V extending respectively along said portions of the rim.

Other details, objects and advantages of the invention will become apparent as the following description of certain present preferred embodiments thereof proceeds.

In the accompanying drawings I have shown certain present preferred embodiments of the invention in which FIGURE 1 is a side view of a removable handle for utensils;

FIGURE 2 is a plan view of the removable handle for utensils shown in FIGURE 1;

FIGURE 3 is a cross-sectional view of the handle shown in FIGURES 1 and 2 applied to a utensil, the cross section of the handle being taken along the line III—III of FIGURE 2;

FIGURE 4 is a perspective view showing the handle applied to a utensil and indicating how a single handle may be used for handling utensils of different sizes;

FIGURES 5, 6, 7 and 8 are fragmentary cross sectional views of modified forms of handle and utensil rim;

Figure 9:
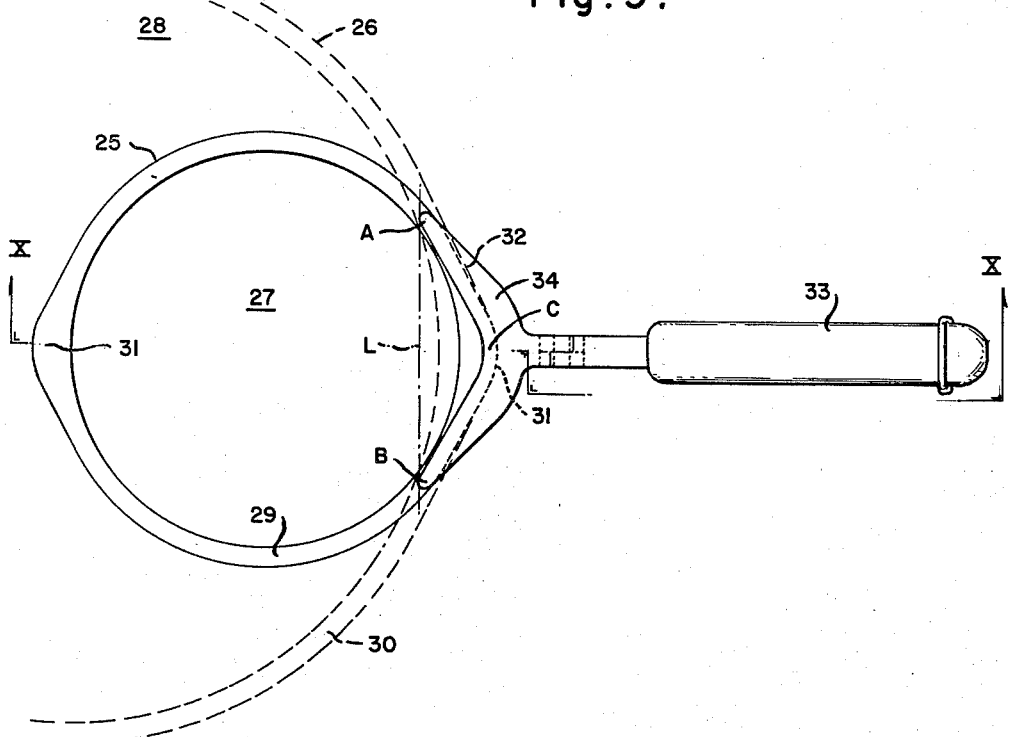
FIGURE 9 is a diagrammatic plan view illustrating the application of my invention to utensils having generally circular rims.

Referring now more particularly to the drawings, I have illustrated in FIGURES 3 and 4 a utensil shown as being in the form of a container or pan which may be fabricated of sheet metal, such, for example, as aluminum, or of plastic or other material and comprising a bottom 2 and a peripheral side wall 3 terminating in a peripheral rim 4 which in turn terminates in a bead 5. The bead 5 is made by turning the metal over upon itself and compressing it as will be apparent from FIGURE 3.

The pan as shown in FIGURES 3 and 4 is non-circular having a rim having portions merging in a corner. In FIGURE 4 the pan rim 4 is shown as having substantially straight portions 6 which merge in a rounded corner 7. The pan shown in solid lines in FIGURE 4 is generally square with rounded corners so that all of the four corners are of the same conformation and the handle presently to be described may be applied to each thereof. FIGURE 4 shows in chain lines at 8 a pan similar to the pan shown in solid lines but of larger size. The two pans of different sizes have substantially identical rim formations and rounded corners. Thus only a single handle is required for handling all of the pans of the set (obviously similar pans of other sizes may be provided).

One form of my removable handle is shown in FIGURES 1–4 and is designated generally by reference numeral 9 and comprises opposed handle members 10 and 11 respectively having gripping jaws 10a and 11a and connected together so as to be relatively manipulatable to grip the utensil rim in the region of a corner thereof. I have shown the handle members 10 and 11 as being pivotally connected to each other by a pivot member 12 so that they may operate similarly to a pair of pliers. The handle members 10 and 11 may be made of metal or other suitable material. Applied to each of those members is a grip portion of wood, plastic or other suitable material facilitating handling of the removable handle and also inhibiting the passage of heat from jaws 10a and 11a to the grip portions. The grip portions are designated 13. One of the handle members pivotally carries a bail 14 shown in FIGURE 1 in operative position in solid lines and in inoperative position in chain lines for maintaining the handle 9 in gripping relationship to the utensil. A spring member 15 may be connected with one of the handle members and normally urge them apart. The members and portions 10, 11 and 13 constitute the holding portion of the removable handle which projects outwardly and is adapted to be held in the hand of the person using the utensil. The holding portion, as shown in FIGURES 2 and 4, is, when the removable handle is applied to the utensil, disposed so as to substantially bisect the outside angle of the rim of the utensil formed by the portions of the rim which merge in a corner thereof.

The jaws 10a and 11a have active gripping portions 16 of generally V shape (see FIGURES 2 and 4) with the arms of the V extending respectively along the portions of the pan rim adjacent the corner where the pan is gripped by the removable handle. The jaw 10a is cut away at 17 to provide clearance for the bead 5.

It is to be understood that my removable handle will be designed for application to a particular form of utensil or set of utensils. While I perfer to employ utensils having straight sides merging in rounded corners the sides may be curved.

FIGURES 5, 6, 7 and 8 show in cross section modified forms of utensil rims and gripping jaws to cooperate therewith. In FIGURE 5 the utensil rim has an upset bead 18 and both jaws are recessed at 19 to provide clearance for the bead. FIGURE 6 shows a somewhat similar structure but in which the bead 20 is formed by turning the material of the rim upon itself rather than by upsetting. FIGURE 7 shows an upturned bead 21 with the upper clamping jaw recessed at 22 and FIGURE 8 shows a downturned bead 23 with the lower clamping jaw recessed at 24.

Figure 10:
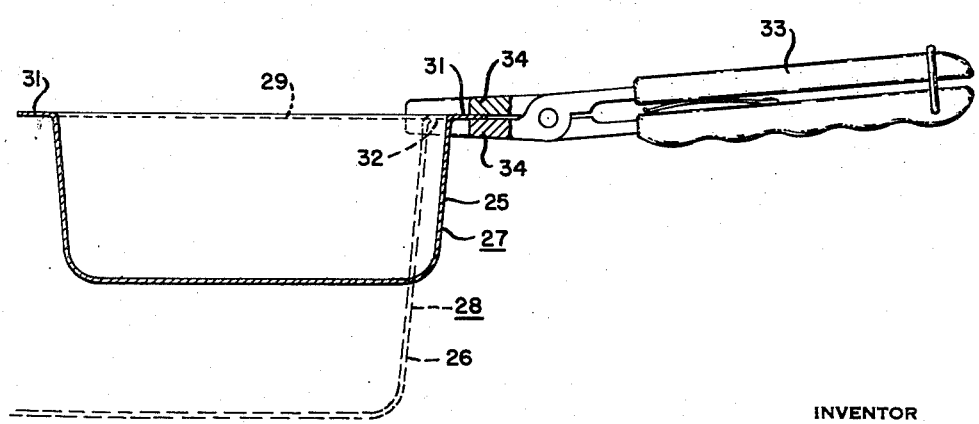
FIGURE 10 is a fragmentary cross-sectional view taken on the line X—X of FIGURE 9.

FIGURES 9 and 10 illustrate the application of my invention to utensils having generally circular rims. A relatively small utensil having a circular rim is shown in solid lines and designated generally by reference numeral 25 while a relatively large utensil having a circular rim is shown in dotted lines and designated generally by reference numeral 26. Both of the utensils 25 and 26 are shown as having circular bodies, which bodies are designated 27 and 28, respectively. The utensil 25 has a circular rim 29 and the utensil 26 has a circular rim 30.

The rim 29 of the utensil 25 has diametrically opposed extensions or ears 31 and the rim 30 of the utensil 26 has diametrically opposed extensions or ears 32. Diametrically opposed ears are shown only as an example. In practice, such utensils might have one or more such ears located as desired around the periphery of the utensil body. Beyond the portion to be gripped by the handle, no rim at all is necessarily required.

The handle shown in FIGURES 9 and 10, designated generally by reference numeral 33, is similar to the handle 9 shown in FIGURES 1–4 except that each of the jaws of the handle 33 has an active gripping portion 34 respectively engaging one of the opposed faces of the rim of the utensil 25 or 26 as the case may be at at least three points relatively located so that a straight line joining two of the points lies in a plane perpendicular to the plane of the rim which intersects the body of the utensil. The three points are designated in FIGURE 9 by the letters A, B and C, respectively. The gripping portions 34 of the jaws of the handle 33 grip the rim of the utensil 25 or 26 so that a straight line L joining the points A and B lies in a plane perpendicular to the plane of the rim 29 or 30 as the case may be and which intersects the body 27 or 28 of the utensil.

The jaws of the handle 33 are shown as being disposed at an angle of approximately 120° to each other rather than at an angle of approximately 90° as in the case of the handle 9 shown in FIGURES 1–4, but in both cases the handle functions in the same way in that at least one and preferably each of the opposed jaws has a gripping portion engaging a face of the rim of the utensil being gripped at at least three points relatively located so that a straight line joining two of the points lies in a plane perpendicular to the plane of the rim which intersects the body of the utensil. As above explained, the relative location of the defined points of engagement of the jaws of the handle with the rim of the utensil insures a tight rigid grip on the utensil and obviates any tendency of the projecting portion of the utensil to bend down or sag relatively to the gripped portion.

My handle may be designed for use with square utensils or round utensils or utensils of other shapes and a single handle is applicable to utensils of different sizes as has been demonstrated. Also a single handle may be used with utensils of different shapes. The rims of the utensils shown in FIGURES 9 and 10 may be formed like the rim of the utensil shown in FIGURES 3 and 4 or like any of those shown in FIGURES 5, 6, 7 and 8, and the jaws of the handle will be shaped conformably.

While I have shown and described certain present preferred embodiments of the invention it is to be distinctly understood that the invention is not limited thereto but may be otherwise variously embodied within the scope of the following claims.

I claim:

1. A utensil having a rim having portions merging in a corner and a removable handle for the utensil appliable to the utensil with the hereinafter mentioned holding portion thereof disposed so as to substantially bisect the outside angle of the rim formed by said portions of the rim, the handle having opposed jaws connected together so as to be relatively manipulatable to grip the utensil rim in the region of the corner, each of the opposed jaws being constructed and arranged to engage one face only of the rim, at least one of the opposed jaws having a gripping portion of generally V shape with the arms of the V extending respectively along said portions of the rim, and an outwardly projecting holding portion adapted to be held in the hand of the person using the utensil.

2. A utensil having a rim having portions merging in a corner and a removable handle for the utensil appliable to the utensil with the hereinafter mentioned holding portion thereof disposed so as to substantially bisect the outside angle of the rim formed by said portions of the rim, the handle having opposed jaws connected together so as to be relatively manipulatable to grip the utensil rim in the region of the corner, each of the opposed jaws being constructed and arranged to engage one face only of the rim, each of the opposed jaws having a gripping portion of generally V shape with the arms of the V extending respectively along said portions of the rim, and an outwardly projecting holding portion adapted to be held in the hand of the person using the utensil.

3. A utensil having a rim having a bead at its edge, the rim having portions merging in a corner, and a removable handle for the utensil appliable to the utensil with the hereinafter mentioned holding portion thereof disposed so as to substantially bisect the outside angle of the rim formed by said portions of the rim, the handle having opposed jaws connected together so as to be relatively manipulatable to embrace the bead and grip the utensil rim in the region of the corner, each of the opposed jaws being constructed and arranged to engage one face only of the rim, at least one of the opposed jaws having a gripping portion of generally V shape with the arms of the V extending respectively along said portions of the rim, and an outwardly projecting holding portion adapted to be held in the hand of the person using the utensil.

4. A utensil having a rim having a bead at its edge, the rim having portions merging in a corner, and a removable handle for the utensil appliable to the utensil with the hereinafter mentioned holding portion thereof disposed so as to substantially bisect the outside angle of the rim formed by said portions of the rim, the handle having opposed jaws connected together so as to be relatively manipulatable to embrace the bead and grip the utensil rim in the region of the corner, each of the opposed jaws being constructed and arranged to engage one face only of the rim, each of the opposed jaws having a gripping portion of generally V shape with the arms of the V extending respectively along said portions of the rim, and an outwardly projecting holding portion adapted to be held in the hand of the person using the utensil.

5. A utensil having a rim having generally straight portions merging in a corner and a removable handle for the utensil appliable to the utensil with the hereinafter mentioned holding portion thereof disposed so as to substantially bisect the outside angle of the rim formed by said portions of the rim, the handle having opposed jaws connected together so as to be relatively manipulatable to grip the utensil rim in the region of the corner, each of the opposed jaws being constructed and arranged to engage one face only of the rim, at least one of the opposed jaws having a gripping portion of generally V shape with the arms of the V extending respectively along said portions of the rim, and an outwardly projecting holding portion adapted to be held in the hand of the person using the utensil.

6. A utensil having a rim having generally straight portions merging in a rounded corner and a removable handle for the utensil appliable to the utensil with the hereinafter mentioned holding portion thereof disposed so as to substantially bisect the outside angle of the rim formed by said portions of the rim, the handle having opposed jaws connected together so as to be relatively manipulatable to grip the utensil rim in the region of the corner, each of the opposed jaws being constructed and arranged to engage one face only of the rim, at least one of the opposed jaws having a gripping portion of generally V shape with rounded apex conforming to the rounded corner of the rim with the arms of the V extending respectively along said portions of the rim, and an outwardly projecting holding portion adapted to be held in the hand of the person using the utensil.

7. A utensil having a body and a rim and a removable handle for the utensil, the handle having opposed jaws connected together so as to be relatively manipulatable to grip the utensil rim, each of the opposed jaws having a gripping portion engaging one face of the rim at at least three points relatively located so that a straight line joining two of the points lies in a plane perpendicular to the plane of the rim which intersects the body of the utensil, and an outwardly projecting holding portion adapted to be held in the hand of the person using the utensil.

References Cited in the file of this patent

UNITED STATES PATENTS

| 323,894 | Whitten | Aug. 4, 1885 |
| 2,165,159 | Stathem | July 4, 1939 |
| 2,478,784 | Serio | Aug. 9, 1949 |

FOREIGN PATENTS

| 493,898 | Italy | Dec. 10, 1954 |